Figure 1:
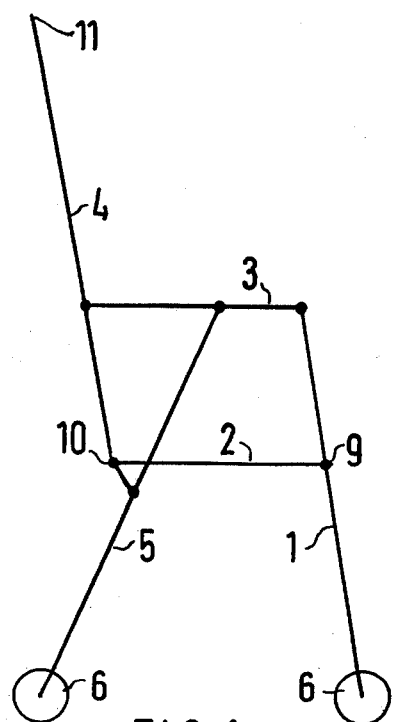
Figure 2:
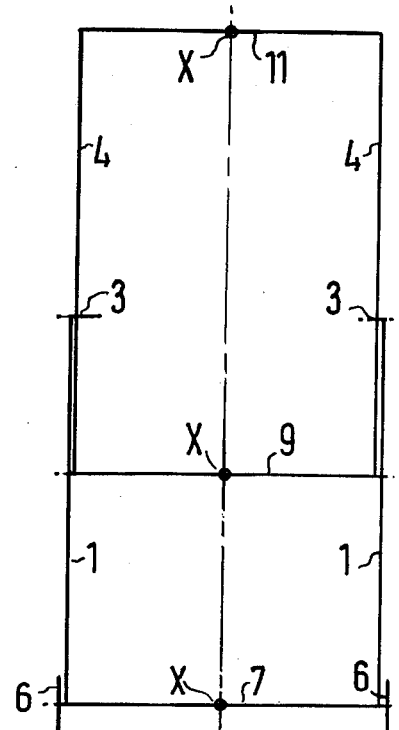

United States Patent [19]

Sparkes

[11] 3,989,295
[45] Nov. 2, 1976

[54] FOLDING CHAIRS

[76] Inventor: Curtis A. Sparkes, 12 Highgate Road, Altrincham, Cheshire, England

[22] Filed: Nov. 4, 1974

[21] Appl. No.: 520,867

[30] Foreign Application Priority Data
Nov. 19, 1973 United Kingdom............... 53593/73

[52] U.S. Cl................................ 297/39; 280/651; 297/45
[51] Int. Cl.². ........................................ A47C 4/42
[58] Field of Search .................. 297/39, 16, 45, 44, 297/42, 43; 280/36 B, 42, 38, 39; 5/57 B

[56] References Cited
UNITED STATES PATENTS

| 404,494 | 6/1889 | McBoyle | 280/38 |
|---|---|---|---|
| 663,857 | 12/1900 | Browder | 5/57 B |
| 1,110,695 | 9/1914 | Johnson | 297/43 |
| 2,397,322 | 3/1946 | McArthur | 297/42 |
| 2,429,763 | 10/1947 | Lindabury | 280/38 |
| 2,871,921 | 2/1959 | Arnold | 297/39 |
| 2,906,319 | 9/1959 | Goldstein | 297/39 |
| 3,624,814 | 11/1971 | Borichevsky | 297/39 X |
| 3,797,848 | 3/1974 | Burnham | 280/36 B |
| D136,914 | 12/1943 | Kolker | 297/39 X |

*Primary Examiner*—Ramon S. Britts
*Assistant Examiner*—William E. Lyddane
*Attorney, Agent, or Firm*—Larson, Taylor and Hinds

[57] ABSTRACT

A folding chair, especially a wheeled push chair for a child, comprises a pair of similar side frames of inter-pivoted bars and cross-members integral with the side frames, the cross-members having only intermediate hinges which come into coaxial alignment when the side frames are folded and the side frames can then close together like a book.

10 Claims, 10 Drawing Figures

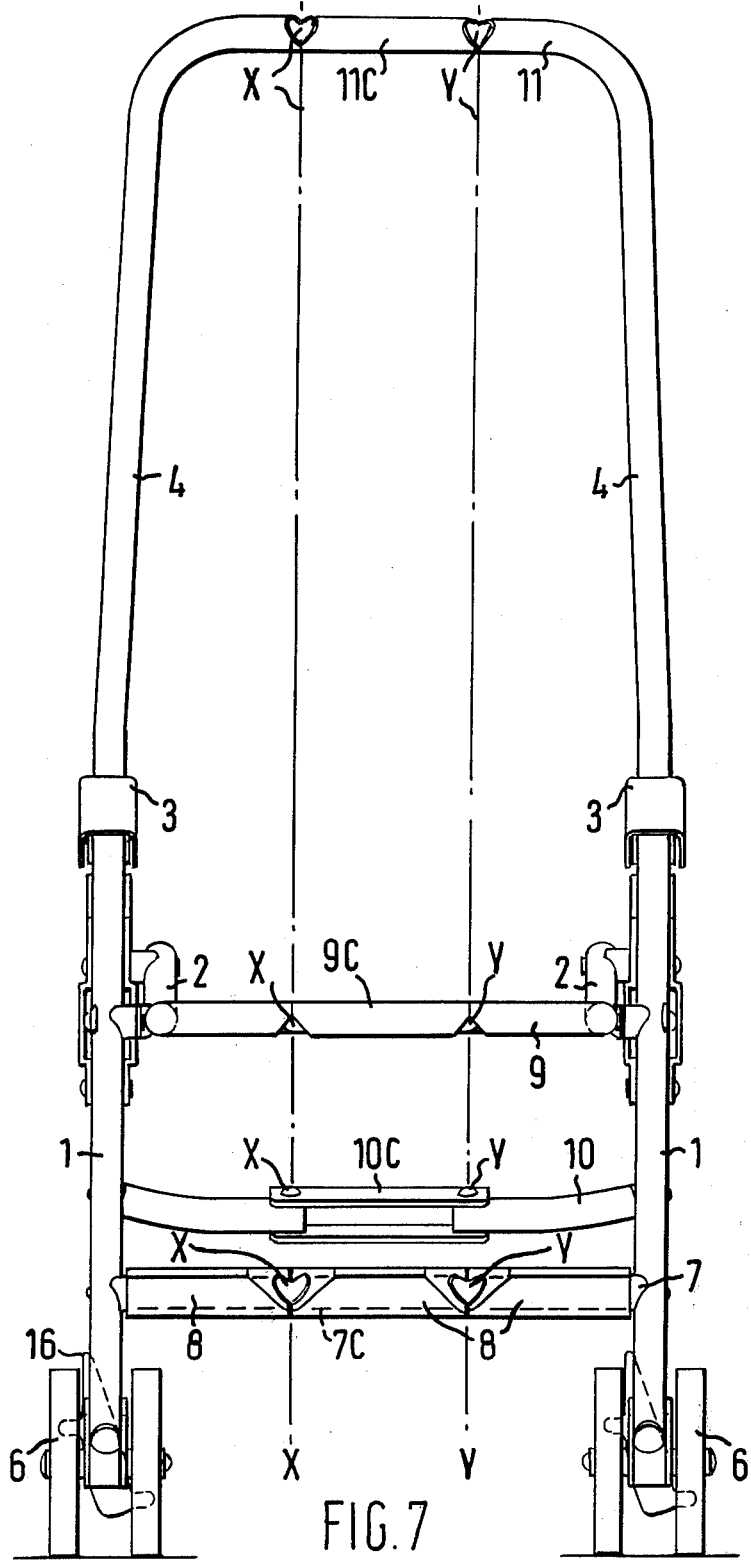

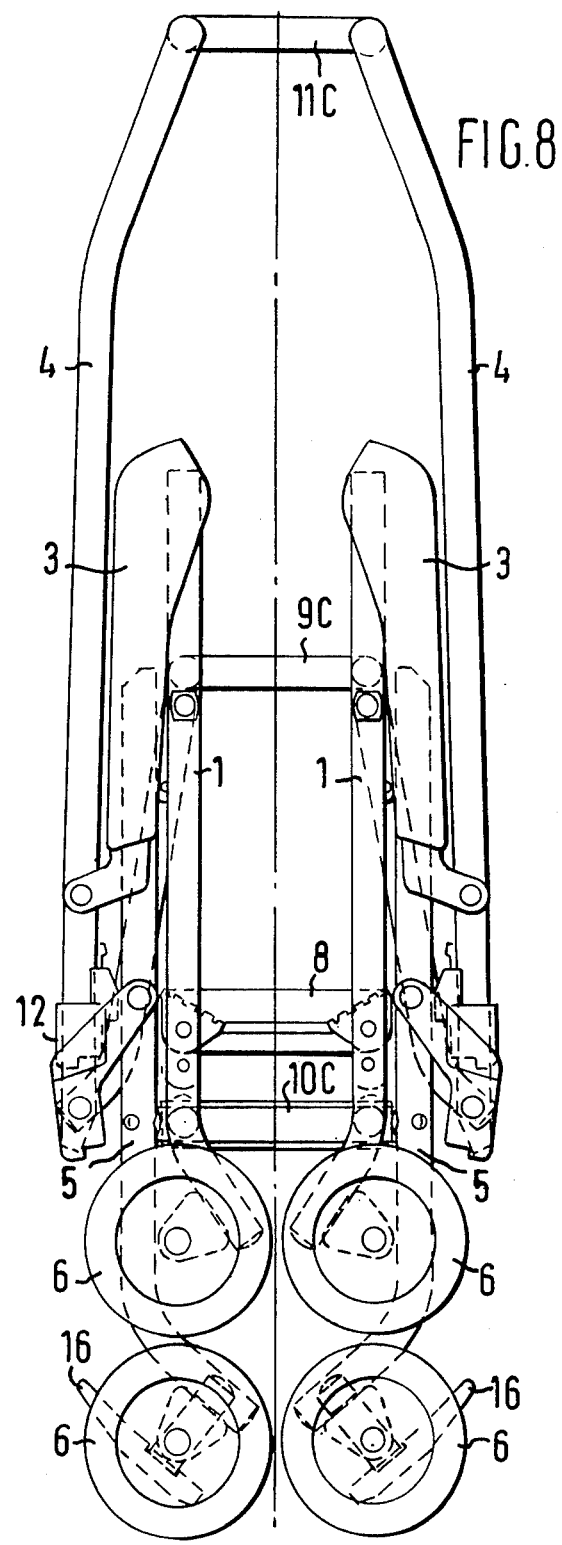

FOLDING CHAIRS

This invention relates to folding chairs and particularly, but not exclusively, folding push chairs for children.

It has been proposed to provide a kind of folding chair comprising a pair of similar folding side frames interconnected by cross-members, the side frames each consisting of interpivoted bars which can move between an open position of use and a folded position wherein the bars lie side-by-side and the cross-members being hinged so that the folded side frames can be closed towards one another.

In such prior proposal, the cross-members are constituted by a complicated structure of bars and links hinged by their ends to the side frames as well as to a central member of U-brackets and connecting bars.

The present invention provides a simple but strong construction of a folding chair with folding side frames and hinged cross-members and, according to the invention, the cross-members have their ends integral with the side frames and only intermediate hinges which are arranged to come into coaxial alignment in the folded position of the side frames which can then close together like a book.

The ends of the cross-members may be made integral with the side frames by being integral extensions from or secured to appropriate side frame bars.

The cross-member hinges can be simple pivots, which can be incorporated without any projections in tubular cross-members, and for compact closing, especially for wheeled push chairs, the hinges can be offset from the centres of the cross-members.

In a preferred construction, the cross-members each have a central part hinged to end parts which are integral with the side frames so that the cross-member hinges lie in two, normally vertical, planes and the hinges in each plane respectively come into coaxial alignment in the folded position of the side frames.

The side frame bars, preferably of tubular metal, may comprise a front leg, a seat side bar, an arm-rest and a back pillar, all interpivoted to form a quadrilateral linkage, and a back leg pivoted to the back pillar and to the arm-rest.

The cross-members, also principally of tubular metal, may comprise a lower front rail, conveniently made as a foot-rest, a front seat rail, a lower back rail and an upper back rail which, for a push chair, is formed as a handle bar.

When the chair is in the open position of use, the axes of the cross-member hinges are out of alignment so that the side frames cannot close together and the structure is self-locking. To lock the side frames open, a locking member, in particular a spring-loaded sleeve slidable on a back pillar, is biased into a position in which it engages an abutment, on a back leg or other adjacent bar, to prevent folding of the side frame.

For a push chair, wheels are provided, preferably as twin-wheels, on the front and back legs and a wheel-engaging brake is provided.

Figure 3:
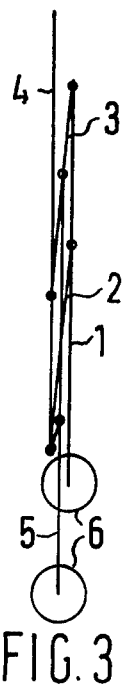
Figure 4:
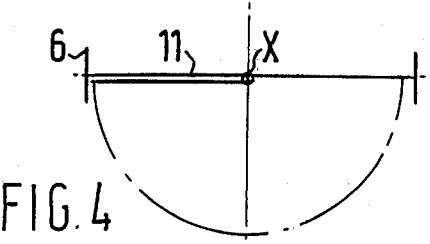
Figure 9:
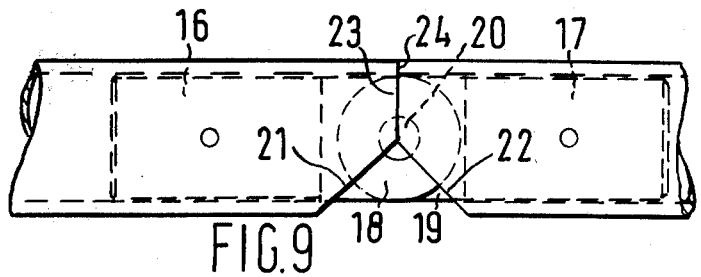
Figure 5:
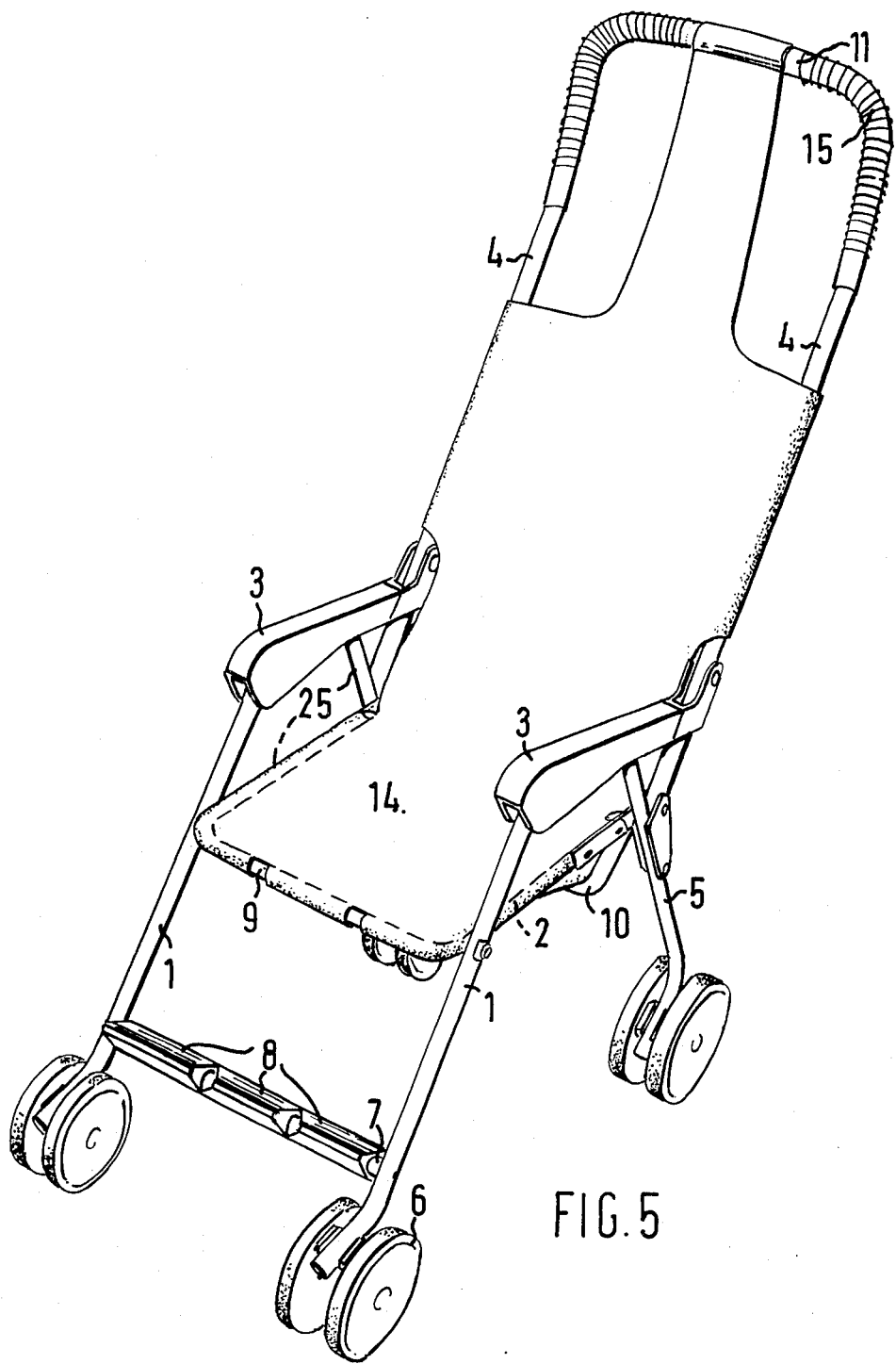

The invention is illustrated, by way of example, on the accompanying drawings, in which:

FIGS. 1 to 4 are diagrams of a wheeled push chair, to show the principle of the invention, respectively in side elevation and front view, in the open position, in side elevation, with the side frames folded, and in plan in the fully closed position, FIG. 5 is a perspective view of one embodiment of a child's folding push chair, FIGS. 6, 6A, 7 and 8 show the construction of the frames and cross-members of a similar embodiment, with some modifications in detail, respectively in side elevation open, front view open and front view fully folded and closed, and FIG. 9 is a fragmentary view showing a preferred hinge construction for tubular cross-members.

The foregoing description can be read in conjunction with the accompanying drawings in which it can be seen that a folding chair as illustrated comprises a pair of similar wheeled folding side frames interconnected by hinged cross-members carrying a seat of flexible sheet material.

Each side frame comprises interpivoted bars providing a front leg 1, a seat side bar 2, an arm-rest 3, a back pillar 4 and a back leg 5. The legs 1 and 5 have wheels 6. Arm rest 3 is pivotably connected to both front legs 1 and back legs 6.

The cross-members comprise a lower front rail 7, with foot-rest sections 8, a front seat rail 9, a lower back rail 10 and an upper back rail 11 forming a handle bar. The ends of the front seat rail 9 and handle bar rail 11 are integral extensions from the seat side bars 2 and back pillars 4 respectively and the ends of the foot-rest rail 7 and lower back rail 10 are securely united to the front legs 1 and back pillars 4 respectively so as to constitute integral parts thereof.

In the diagrammatic illustration of FIGS. 1 to 4, the cross-members each have one central intermediate hinge at X to enable the folded side frames to close together simply like a book as indicated by FIG. 4. It should be noted that FIG. 3 is a highly diagrammatic representation of the folding chair in the collapsed state prior to the final folding step illustrated in FIG. 4.

In the constructions shown by FIGS. 5 to 9, each cross-member has a central part 7C, 9C etc. hinged to the end parts by respective hinges X and Y which lie in two parallel, normally vertical, planes X—X, Y—Y indicated in FIG. 7.

When the side frames are folded, each set or series of hinges X and Y comes into line coaxially in its respective plane and, as shown by FIG. 8, the side frames, with the integral ends of the cross-members, can close together rather like hard covers of a thick book, the central parts of the cross-members staying in place like the spine of a book.

Figure 6:
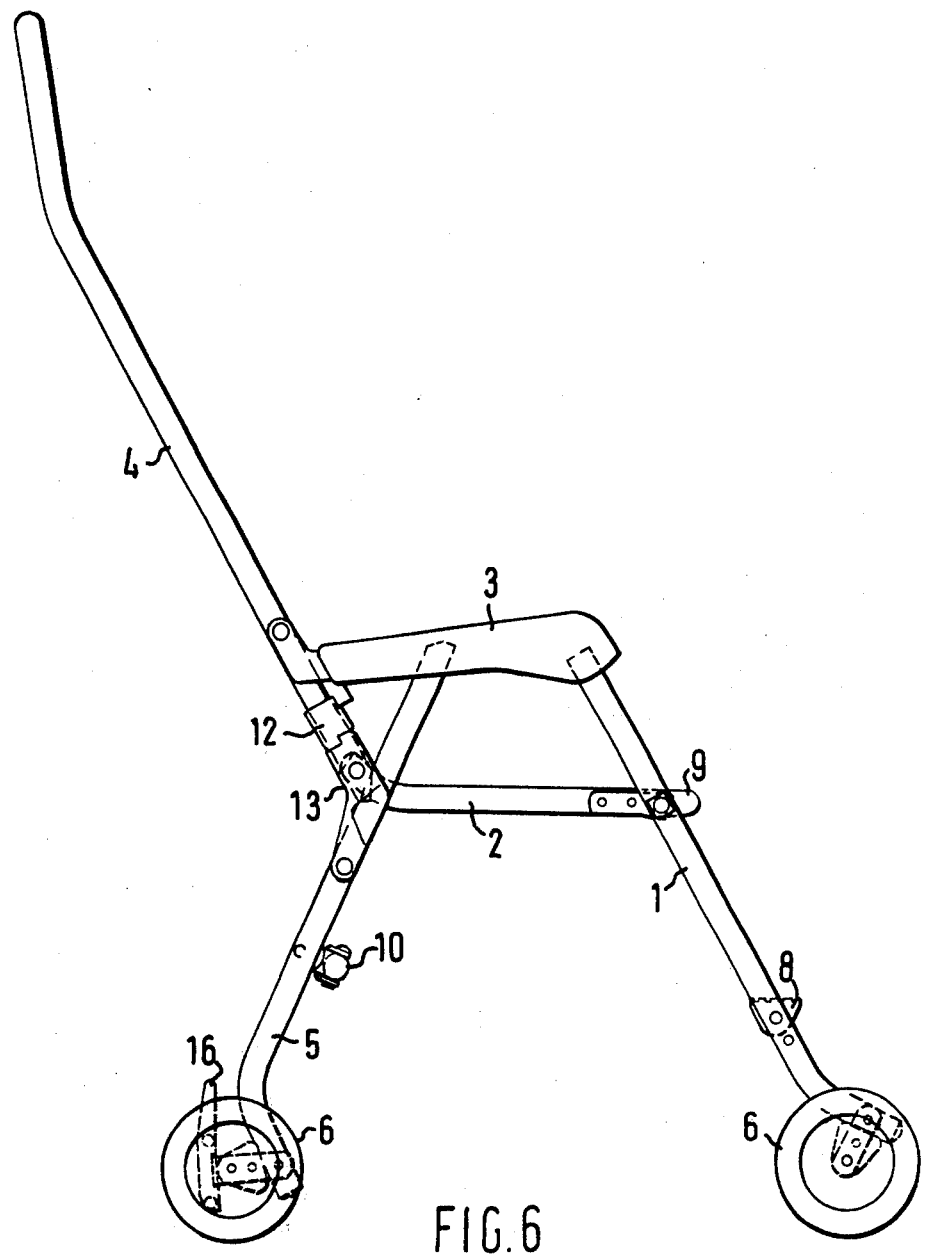
Figure 6A:
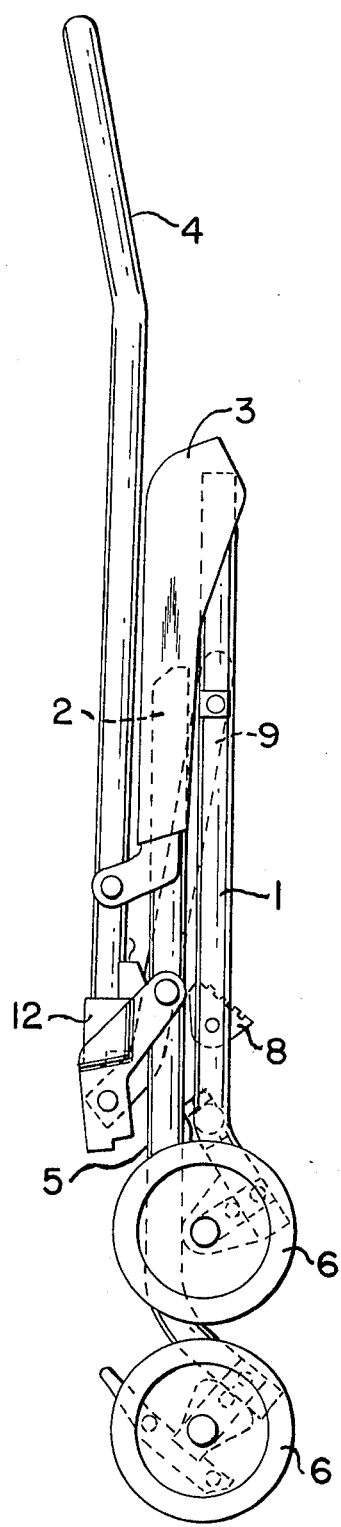

When the chair is open, as shown in FIG. 5 or FIG. 6, the cross-member hinges are out of alignment so that they cannot turn together and the structure is self-locking. This applies also when the chair is partly open. FIG. 6A is a side view which is similar to FIG. 6 but which shows the chair in the intermediate collapsed state thereof wherein the sets of hinges X and Y lie in substantially the same plane so as to enable folding of the outboard portions of the chair to the fully folded position illustrated in FIG. 8.

To maintain the side frames fully open for use, a locking sleeve 12, with a concealed loading spring, is slidable on a back pillar 4 and is notched at its lower end to engage with a correspondingly notched abutment of a bracket 13 on the adjacent back leg 5.

A hammock-type seat 14 (FIG. 5) of flexible sheet material is slung between the front seat rail 9 and the handle bar 11 and the sides of the sheet material are also wrapped around the back pillars 4. The lower back rail 10 extends clearly below the seat 14 so that a child is supported entirely by the seat and does not encounter the lower back rail 10.

The handle bar has flexible corrugated grips 15 for comfort in pushing the chair or carrying it folded, the bends of the handle bar being convenient for slinging the chair on the forearm of the user.

Pivoted lever wheel-engaging brakes 16 are provided for the back wheels.

A preferred hinge for the tubular cross-members is shown by FIG. 9 and comprises closing plugs 16 and 17 in opposed tube ends and respectively providing a forked hinge knuckle 18 and a tongue hinge knuckle 19 with a pivot pin 20.

The tube ends are each cut away, at the same side of the hinge axis, by half the hinging angle required, i.e. by 45° to give a 90° movement. The respective half-round oblique edges 21 and 22 so formed and the remaining half-round transverse edges 23 and 24 provide tube-end abutments at opposite limits of the hinging movement.

A twin push chair, to seat two children side-by-side, can be made from a pair of side-frames, as described and illustrated, and an additional folding frame at the centre secured integrally to the central parts of the cross-members which are made long enough to give the seating width required. The central folding frame may have wheels but they are not essential and bars equivalent to a front leg and a back leg can terminate at the foot-rest and lower back rail respectively.

I claim:

1. A folding chair comprising a substantially parallel pair of similar folding side frames, each side frame including essentially a quadrilateral linkage of interpivoted bars, which bars can be pivoted relatively between an open position of use and a folded position wherein the bars lie side-by-side, and cross-members interconnecting the side frames, the cross-members having their ends each respectively integral with a bar of the respective side frame and the cross-members having hinges located only intermediately of their ends, the hinges being arranged in at least one set lying in a plane substantially parallel to the planes of the side frames and the axes of the hinges of said set lying out of coaxial alignment in the open position of the side frames but extending in coaxial alignment in the folded position of the side frames which can then close together like a book.

2. A folding chair according to claim 1, in which the cross-member hinges are offset from the centres of the cross-members.

3. A folding chair according to claim 2, in which the cross-members each have a central part hinged to end parts which are integral with the side frames so that the cross-member hinges lie in two sets respectively two parallel planes and the hinges in each plane respectively come into coaxial alignment in the folded position of the side frames.

4. A folding chair according to claim 3, in which the bars of each side frame comprise a front leg, a seat side bar, an arm-rest and a back pillar, all interpivoted to form a quadrilateral linkage, and a back leg pivoted to the back pillar and to the arm rest.

5. A folding chair according to claim 4, in which the cross-members comprise a lower front rail, a front seat rail, a lower back rail and an upper back rail.

6. A folding chair according to claim 5, in which said seat side bars of the side frames extend integrally into said front seat rail and said back pillars of the side frames extend integrally into said upper back rail.

7. A folding chair according to claim 6, in which a seat of flexible sheet material is slung between said front seat rail and said upper back rail and said lower back rail is located clearly below said seat material in the open position of use of the chair.

8. A folding chair according to claim 7, in which said lower front rail is formed as a foot-rest and said upper back rail is formed as a handle bar.

9. A folding chair according to claim 1, in which a side frame is provided with a locking member which is movably mounted on one bar of said side frame and is biased into a position in which it engages an abutment on an adjacent bar of said side frame to prevent folding of said side frame from the open to the folded position, the locking member comprising a sleeve slidable on a back pillar bar of said side frame and engageable with an abutment on a back leg bar of said side frame.

10. A folding chair according to claim 4, in which the front and back leg bars of the side frames are provided with wheels.

* * * * *